United States Patent Office 3,592,870
Patented July 13, 1971

3,592,870
NICKEL COMPLEX OLEFIN DIMERIZATION
Howard E. Dunn, Bartlesville, Okla., assignor to
Phillips Petroleum Company
No Drawing. Filed May 5, 1969, Ser. No. 821,956
Int. Cl. C07c 3/10
U.S. Cl. 260—683.15                           18 Claims

ABSTRACT OF THE DISCLOSURE

An olefin is dimerized by contact with a catalyst formed from an organoaluminum compound and one of the following nickel complexes:

(a) A bis($\beta$-mercaptoethylamine)nickel (II) complex;
(b) An $\alpha$-diketobis($\beta$-mercaptoethylimine)nickel (II) complex;
(c) A S,S-disubstituted bis($\beta$-mercaptoethylamine)nickel (II) complex; or
(d) A S,S-disubstituted-$\alpha$-diketone bis($\beta$-mercaptoethylimine)nickel (II) complex.

---

This invention relates to a method for the dimerization of olefins. In another aspect, the invention relates to a method for the dimerization of olefins in the presence of a catalyst formed from an organoaluminum compound and a nickel complex. In still another aspect, this invention relates to novel catalysts for olefin dimerization.

Many processes have been developed for olefin dimerization. However, few of the processes have provided catalysts having high activity and high selectivity for the production of olefin dimers.

Therefore, it is an object of this invention to provide a method for the dimerization of olefins. It is another object of this invention to provide novel catalysts for the production of olefin dimers.

Other objects, advantages and features of my invention will be apparent to one skilled in the art from the following disclosure and claims.

I have found that $C_2$ to $C_{12}$ acyclic and cyclic olefins can be dimerized according to the process of this invention by contacting the olefin with a catalyst formed by the admixture of an organoaluminum compound represented by the formula $R_m^1AlX_m$ in combination with a complex of nickel, as subsequently defined, where $R^1$ is an alkyl, alkenyl, aryl, or a cycloalkyl radical, or a combination thereof such as an alkaryl or aralkyl radical, having from 1 to 12 carbon atoms, X is a halogen, $n$ can be the integer 1, 2, or 3, $m$ can be 0 or the integer 1 or 2, and the sum of $n$ and $m$ equals 3. I have further found that according to this invention a catalyst formed by the admixture of the two components disclosed above has a high selectivity for the production of dimers of olefins.

Some specific examples of the organoaluminum component of the catalyst system are: methylaluminum dichloride, dimethylaluminum chloride, diethylaluminum bromide, ethylaluminum dibromide, triethylaluminum, vinylaluminum diiodide, tributylaluminum, dibutylaluminum fluoride, phenylaluminum dibromide, dibenzylaluminum chloride, 4-tolylaluminum dichloride, dodecylaluminum dibromide, and the like, and mixtures thereof such as methylaluminum sesquichloride. Presently preferred aluminum compounds are organoaluminum halides, particularly those containing radicals of the lower hydrocarbons such as methyl and ethyl.

The nickel complex component of the catalyst system can be represented by the following formulas having the structures:

(a) 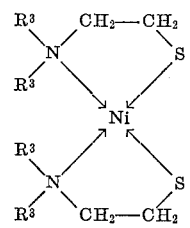

(b) 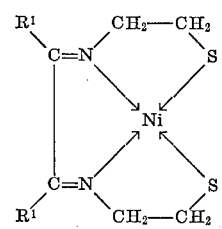

(c) 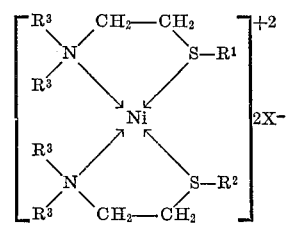

(d) 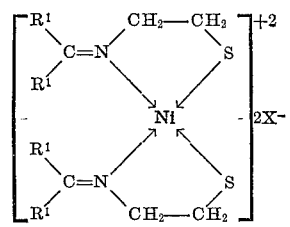

wherein each $R^1$ is as previously defined and $R^3$ is hydrogen or an $R^2$ radical. $R^2$ is defined the same as $R^1$ and $R^1$ and $R^2$ can be combined to form a single divalent radical such as methylene, dimethylene, trimethylene, o-xylylene, 1,3-cyclopentylene, and the like, and wherein X is a halide such as chloride, bromide, iodide or fluoride or any convenient anion.

This type of nickel complex can be prepared by conventional methods known in the art. For example, the procedures disclosed in Busch et al., J. Am. Chem. Soc., 86 (1964) are appropriate.

Specific examples of these nickel complexes are:

bis(N,N-dimethyl-$\beta$-mercaptoethylamine)nickel (II);
bis(N-decyl-$\beta$-mercaptoethylamine)nickel (II);
bis(N,N-dibutyl-$\beta$-mercaptoethylamine)nickel (II);
bis(N-benzyl-$\beta$-mercaptoethylamine)nickel (II);
bis(N-cyclopentyl-$\beta$-mercaptoethylamine)nickel (II);
bis(N,N-dihexyl-$\beta$-mercaptoethylamine)nickel (II);
bis($\beta$-mercaptoethylamine)nickel (II);
biacetylbis($\beta$-mercaptoethylimine)nickle (II);
2,3-pentanedionebis($\beta$-mercaptoethylimine)nickel (II);
1,4-diphenyl-2,3-butanedionebis($\beta$-mercaptoethylimine) nickel (II);
6-cyclohexyl-3,4-hexanedionebis($\beta$-mercaptoethylimine) nickel (II);
2,3,6,7-tetramethyl-4,5-octanedionebis($\beta$-mercaptoethylimine)nickel (II);

S,S-dimethylbis(β-mercaptoethylamine)dibromonickel (II);
S,S-dibenzylbis(β-mercaptoethylamine)dichloronickel (II);
S,S-dimethylenebis(β-mercaptoethylamine)diiodonickel (II);
S,S-o-xylylenebis(β-mercaptoethylamine)dibromonickel (II);
S,S-dicyclopentylbis(β-mercaptoethylamine)difluoronickel (II);
S,S-dibutyl-2,3-pentanedionebis(β-mercaptoethylimine)diiodonickel (II);
S,S-o-xylylene-2,3-octanedionebis(β-mercaptoethylimine)dibromonickel (II);
S,S-trimethylene-4,5-nonanedionebis(β-mercaptoethylimine)dichloronickel (II);
S,S-1,2-cyclopentylene-1,2-propanedionebis(β-mercaptoethylimine)difluoronickel (II);
S,S-dibenzyl-1,2-cyclohexanedionebis(β-mercaptoethylimine)diiodonickel (II);
and the like and mixtures thereof.

The components of the catalyst are usually combined in proportion in a range of 0.5:1 to about 20:1 moles of aluminum compound per mole of nickel complex. Catalyst poisons in the system can be scavenged by employing even greater proportions of the organoaluminum component.

The catalyst of the present invention is prepared by combining the first and second components of the catalyst under conditions of time and temperature which permit the active catalyst to be formed. The two components of the catalyst can be mixed at any convenient temperature within the range of about −80 to about 100° C. for a period of time ranging from a few seconds up to several hours in the presence of a diluent in which both of the two components are at least partially soluble. Examples of suitable solvents or diluents are benzene, cyclohexane, chlorobenzene, methylene chloride, ethylene chloride, and the like. However, halogenated diluents are preferred. The forming of the catalyst by admixing the two components is generally carried out in an inert atmosphere and in the substantial absence of air or moisture. After the catalyst is formed, it need not be isolated but can be added directly to the reaction zone as a solution or suspension in its preparation medium. If desired, the components used to form the catalyst can be separately added, in any order, to the reaction zone either in the presence or absence of the feed olefin.

The olefins to which the present dimerization process is directed include cyclic monoolefins having up to about 12 carbon atoms per molecule and acyclic monoolefins having from about 2 to 12 carbon atoms, inclusive, where the acyclic monoolefin can be a terminal or an internal olefin, branched or unbranched, but preferably has no branching nearer than the 3-position to the double bond. Examples of suitable monoolefins which can be used according to the present invention are ethylene, propylene, butene-1, butene-2, pentene-1, pentene-2, cyclopentene, cyclohexene, 3,4,5-trimethylcyclohexene, 3-methyl-butene-1, cycloheptene, hexene-2, heptene-1, cyclooctene, 4,4-dimethylheptene-2, decene-1, dodecene-1, and the like, and mixtures thereof. The presently preferred olefins are ethylene and propylene. Mixtures of olefins can be contacted with the catalysts to form "codimers"; for example ethylene and butylenes react to form hexenes, propylene and butylenes react to form heptenes, etc.

The dimerization of the olefin or mixture of olefins can take place at temperatures within the range of −80 to about 200° C., and preferably within the range of −10 to about 50° C. Normally, it is desirable to carry out the dimerization reaction under pressures ranging up to about 2000 p.s.i.g., and preferably 20–500 p.s.i.g. The dimerization can be carried out in the presence of a diluent such as that used for the catalyst preparation if desired. The time of contact of the olefin with the catalyst for the dimerization of the olefin will vary depending upon the desired degree of conversion but, generally will be wthin the range from about 0.1 minute to about 20 hours, preferably 5 to 120 minutes. The proportion of catalyst composition of olefin feed in the reaction zone will generally be within the range of about 0.001 to about 100 millimoles of nickel complex per mole of olefin feed.

Any conventional contacting technique can be utilized for the olefin dimerization and batchwise or continuous operations can be utilized. After the desired degree of conversion of the olefin to the dimer, the products so formed can be separated and isolated by conventional means such as by fractionation, crystallization, adsorption, and the like. The unconverted feed material can be recycled to the reaction zone. If desired, the catalyst can be destroyed by treatment with suitable deactivating agents such as water or alcohol, prior to the separation of the products.

The dimers produced and the dimerization of olefins can be used for many purposes. For example, olefin dimers such as propylene dimers can be employed to make oxo alcohols which are used in the preparation of plasticizers such as for plasticizing polyvinyl chloride resins. Also, propylene dimers can be cracked by conventional methods to make isoprene.

The advantages of this invention are further illustrated by the following examples. The reactants and the proportions and other specific conditions are presented as being typical and should not be construed to limit the invention unduly.

EXAMPLES I–VI

In each of these examples a 0.1 millimole sum quantity of nickel complex and 20 ml. chlorobenzene were added to a stirrer-equipped 7 oz. reaction flask which had previously been dried and flushed with nitrogen. Propylene was then pressured in at 30 p.s.i.g. and then reduced to about 5 p.s.i.g. A 1.5 ml. quantity of a 1 molar solution of ethylaluminum dichloride in chlorobenzene was then added to the flask, the propylene pressure was returned to 30 p.s.i.g., and the reaction mixture was allowed to stir while the flask was immersed in a water bath at 17.5–24.6° C. After a 30 minute reaction period, the reaction was terminated by the addition of 10 ml. water. The organic layer was decanted off and distilled at about atmospheric pressure, collecting the $C_6$ olefin fraction. The selectivity to dimers, in each test, was about 80–90 percent. A 2 ml. sample of the hexenes was conventionally hydrogenated over $PtO_2$ to determine the types of hexene isomers obtained.

The data and results of these runs are shown in Table I.

TABLE I.—DIMERIZATION OF PROPYLENE

| | | | Isomer distribution of hydrogenated dimers | | | |
|---|---|---|---|---|---|---|
| Example | Nickel complex | Dimer yield, g. | 2-methyl-pentane | Normal hexane | 2,3-dimethyl-butane | 3-methyl-pentane |
| 1 | Bis(N,N-dimethyl-β-mercaptoethylamine)nickel (II) | 22.5 | 65.6 | 29.1 | 4.7 | 0.6 |
| 2 | Bis(N-decyl-β-mercaptoethylamine)nickel (II) | 26.6 | 67.0 | 27.8 | 4.6 | 0.6 |
| 3 | 2,3-pentanedionebis(β-mercaptoethylimine)nickel (II) | 12.2 | 66.9 | 28.2 | 3.0 | 1.0 |
| 4 | 2,3-octanedionebis(β-mercaptoethylimine)nickel (II) | 20.7 | 64.2 | 29.6 | 5.1 | 1.2 |
| 5 | S,S-o-xylylenebis(β-mercaptoethylamine)dibromonickel (II) | 11.3 | 58.2 | 36.9 | 3.2 | 1.7 |
| 6 | S,S-o-xylylene-2,3-octanedionebis(β-mercaptoethylimine)dibromonickel (II) | 20.7 | 60.3 | 33.1 | 5.2 | 1.4 |

These examples demonstrate that the catalyst system was very active for the dimerization of propylene.

Although this invention has been described in considerable detail, it must be understood that such detail is for the purposes of illustration only and that many variations and modifications can be made by one skilled in the art without departing from the scope and spirit thereof.

I claim:
1. A method for the dimerization of olefins having up to 12 carbon atoms per molecule which comprises mixing said olefin, under dimerization conditions, with a catalyst consisting essentially of a nickel complex from one of the following:

(a)

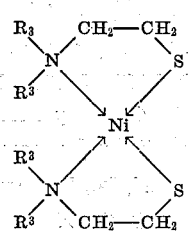

wherein $R^3$ is hydrogen or an alkyl, alkenyl, aryl or a cycloalkyl radical, or a combination thereof having from 1 to 12 carbon atoms;

(b) An α-diketobis(β-mercaptoethylimine)nickel (II) complex having the formula

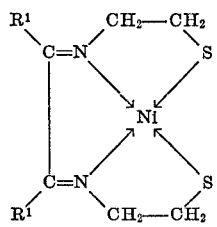

wherein $R^1$ is an alkyl, alkenyl, aryl, or a cycloalkyl radical or a combination thereof having from 1 to 12 carbon atoms;

(c) A S,S - disubstituted bis(β - mercaptoethylamine) nickel (II) complex having the formula

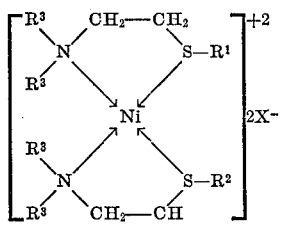

wherein $R^2$ is defined the same as $R^1$, $R^1$ and $R^3$ are defined as above, and $R^1$ and $R^2$ can be combined to form a single divalent radical, and wherein X is a halogen; or (d) A S,S-disubstituted-α-diketobis(β-mercaptoethylimine)nickel (II) complex having the formula

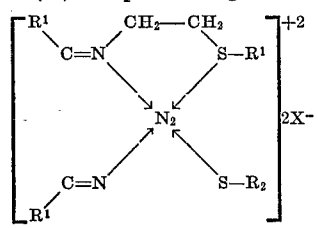

wherein X, $R^1$ and $R^2$ are as defined in (c) in combination with an organo-aluminum compound having the formula $R_n^1 AlX_m$ wherein $R^1$ and X are as defined in (c) and $n$ can be an integer 1, 2 or 3, $m$ can be 0 or the integer 1 or 2 and $n$ plus $m$ equals 3.

2. The method of claim 1 comprising 0.5 to 20 moles of said organo-aluminum compound per mole of said nickel complex.

3. The method of claim 2 wherein the dimerization is carried out at a temperature of from about −80 to about 200° C. and at a pressure sufficient to maintain the materials substantially in the liquid phase.

4. The method of claim 3 wherein said organoaluminum compound is ethylaluminum dichloride.

5. The method of claim 3 wherein said nickel complex is bis (N,N-dimethyl-β-mercaptoethylamine)nickel (II).

6. The method of claim 3 wherein said nickel complex is bis(N-decyl-β-mercaptoethylamine)nickel (II).

7. The method of claim 3 wherein said nickel complex is 2,3-pentane-dionebis(β-mercaptoethylimine)nickel (II).

8. The method of claim 3 wherein said nickel complex is 2,3-octane-dionebis(β-mercaptoethylimine)nickel (II).

9. The method of claim 3 wherein said nickel complex is S,S-o-xylylenebis(β-mercaptoethylamine)dibromonickel (II).

10. The method of claim 3 wherein said nickel complex is S,S-o-xylylene-2,3-octanedionebis(β-mercaptoethylimine)dibromonickel (II).

11. A catalyst for the dimerization of olefins having up to 12 carbon atoms per molecule formed on mixing a nickel complex from one of the following:

(a)

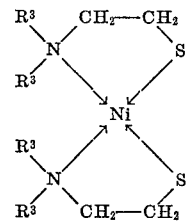

wherein $R^3$ is hydrogen or an alkyl, alkenyl, aryl or a cycloalkyl radical, or a combination thereof having from 1 to 12 carbon atoms;

(b) An α-diketobis(β-mercaptoethylimine) nickel (II) complex having the formula

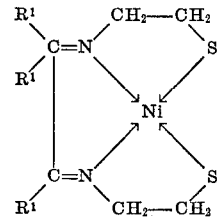

wherein $R^1$ is an alkyl, alkenyl, aryl or a cycloalkyl radical or a combination thereof having from 1 to 12 carbon atoms;

(c) A S,S-disubstituted - bis-(β-mercaptoethylamine) nickel (II) complex having the formula

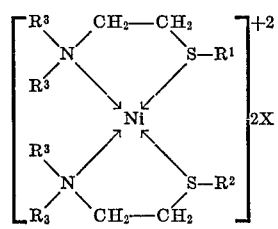

wherein R is defined the same as $R^1$, $R^1$ and $R^3$ are defined as above, and $R^1$ and $R^3$ can be combined to form a single divalent radical, and wherein X is a halogen; or (d) A S,S-disubstituted-α-diketobis(β-mercaptoethylimine)nickel (II) complex having the formula

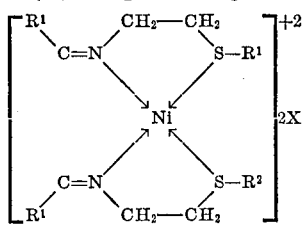

wherein X, $R^1$ and $R^2$ are as defined in (c) in combination with an organo-aluminum compound having the formula $R_n^1AlX_m$ wherein $R^1$ and X are as defined in (c) and $n$ can be an integer 1, 2 or 3, $m$ can be 0 or the integer 1 or 2 and $n$ plus $m$ equals 3.

12. The catalyst of claim 11 wherein said organoaluminum compound is ethylaluminum dichloride.

13. The catalyst of claim 11 wherein said nickel complex consists essentially of bis(N,N-dimethyl-β-mercaptoethylamine)nickel (II).

14. The catalyst of claim 11 wherein said nickel complex consists essentially of bis(N-decyl-β-mercaptoethylamine)nickel (II).

15. The catalyst of claim 11 wherein said nickel complex consists essentially of 2,3-pentanedionebis(β-mercaptoethylimine)nickel (II).

16. The catalyst of claim 11 wherein said nickel complex consists essentially of 2,3-octanedionebis(β-mercaptoethylimine)nickel (II).

17. The catalyst of claim 11 wherein said nickel complex consists essentially of S,S-o-xylylenebis(β-mercaptoethylamine)dibromonickel (II).

18. The catalyst of claim 11 wherein said nickel complex consists essentially of S,S-o-xylylene-2,3-octanedionebis(β-mercaptoethylimine)dibromonickel (II).

References Cited

UNITED STATES PATENTS

| | | | |
|---|---|---|---|
| 3,321,546 | 5/1967 | Roest et al. | 260—683.15 |
| 3,355,510 | 11/1967 | Cannell et al. | 260—683.15 |
| 3,499,887 | 3/1970 | Cooper et al. | 260—439X |

FOREIGN PATENTS

| | | | |
|---|---|---|---|
| 62,561 | 7/1968 | Germany | 260—683.15 |
| 1,532,658 | 6/1968 | France | 260—683.15 |

PAUL M. COUGHLAN, JR., Primary Examiner

U.S. Cl. X.R.

252—431N; 260—439

UNITED STATES PATENT OFFICE

CERTIFICATE OF CORRECTION

Patent No. 3,592,870          Howard E. Dunn          Dated: July 13, 1971

It is certified that error appears in the above-identified patent and that said Letters Patent are hereby corrected as shown below:

Column 2, lines 32-40, the correct formula is:

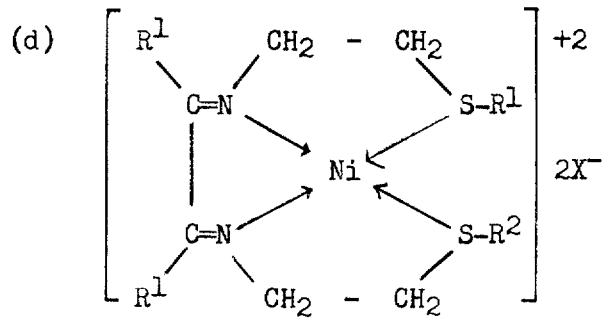

Claim 1, Column 5, lines 45-53, the correct formula is:

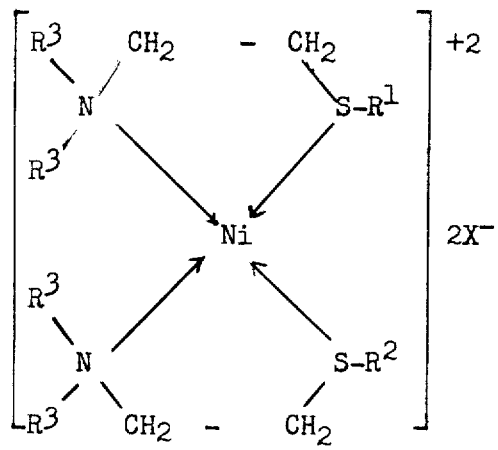

(continued on second sheet)

UNITED STATES PATENT OFFICE
CERTIFICATE OF CORRECTION

Page 2

Patent No. 3,592,870　　　　Howard E. Dunn　　　　Dated: July 13, 1971

It is certified that error appears in the above-identified patent and that said Letters Patent are hereby corrected as shown below:

Claim 1, column 5, lines 60-69, the correct formula (d) is:

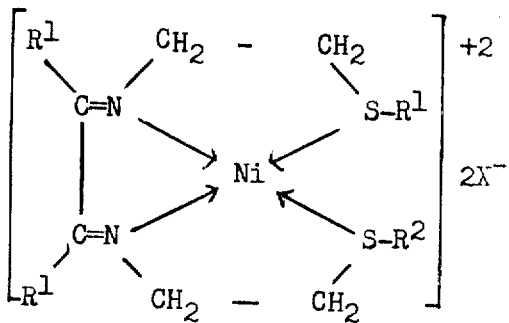

Claim 11, column 6, lines 45-53, the correct formula (b) is:

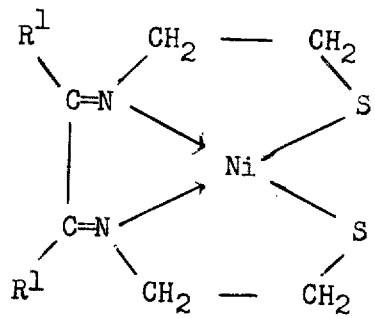

(continued on third sheet)

UNITED STATES PATENT OFFICE

CERTIFICATE OF CORRECTION

Page 3

Patent No. 3,592,870    Howard E. Dunn    Dated: July 13, 1971

It is certified that error appears in the above-identified patent and that said Letters Patent are hereby corrected as shown below:

Claim 11, lines 61-70, column 6, the correct formula (c) is:

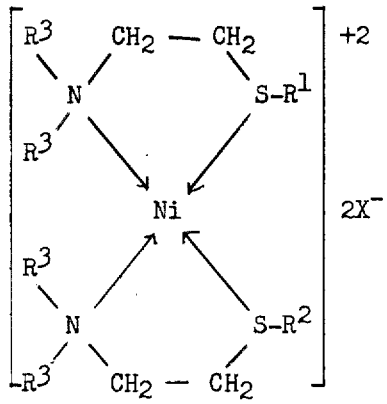

Claim 11, lines 3-11, column 7, the correct formula (d) is:

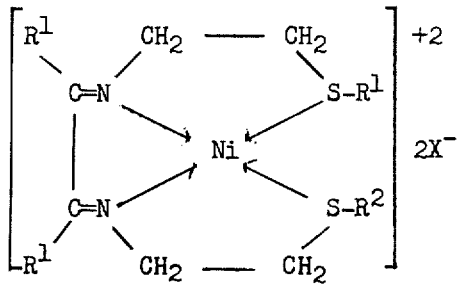

Signed and sealed this 20th day of June 1972.

(SEAL)
Attest:

EDWARD M. FLETCHER, JR.
Attesting Officer

ROBERT GOTTSCHALK
Commissioner of Patents